United States Patent
Han

(10) Patent No.: US 7,379,182 B2
(45) Date of Patent: May 27, 2008

(54) POINTER INSTRUMENT FOR AUTOMOTIVE METER

(75) Inventor: Jae Sun Han, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/636,684

(22) Filed: Dec. 8, 2006

(65) Prior Publication Data

US 2008/0100841 A1   May 1, 2008

(30) Foreign Application Priority Data

Oct. 26, 2006 (KR) .................. 10-2006-0104306

(51) Int. Cl.
*G01J 4/00* (2006.01)
(52) U.S. Cl. .................................. 356/364
(58) Field of Classification Search ............... 356/364
See application file for complete search history.

(56) References Cited

U.S. PATENT DOCUMENTS

2006/0062004 A1* 3/2006 Birman ................. 362/487

FOREIGN PATENT DOCUMENTS

| JP | 09-033294 | 2/1997 |
| JP | 2000-046591 | 2/2000 |
| JP | 2001-074511 | 3/2001 |
| JP | 2003-202247 | 7/2003 |

* cited by examiner

*Primary Examiner*—Roy M. Punnoose
(74) *Attorney, Agent, or Firm*—Morgan Lewis & Bockius LLP

(57) ABSTRACT

A character shielding-preventive pointer instrument for automotive gauges includes a polarizer film having permeability or non-permeability characteristics selectively depending on whether power is supplied thereto. The polarizer film is attached on a lower surface of a front end portion of a pointer needle positioned just above characters of a character plate. Whether or not power is supplied to the polarizer film is controlled depending on the current position of the pointer needle by a micro computer such that the polarizer film is permeable to light when the pointer needle is located above a character of the character plate so that light emitted from the character plate passes through the pointer needle through the polarizer film to prevent the pointer needle from shielding the character.

3 Claims, 4 Drawing Sheets

POINTER INSTRUMENT FOR AUTOMOTIVE METER

CROSS-REFERENCE TO RELATED APPLICATIONS

This application claims the benefit under 35 U.S.C. §119 (a) of Korean Patent Application No. 10-2006-104306, filed in the Korean Intellectual Property Office on Oct. 26, 2006, the entire disclosure of which is incorporated herein by reference.

BACKGROUND OF THE INVENTION

1. Field of the Invention

The present invention relates to a character shielding-preventive pointer instrument for automotive gauges, and more particularly, to such a pointer instrument in which a polarizer film having permeability or non-permeability characteristics selectively depending on whether electric power is applied thereto or not is attached to a pointer needle.

2. Background of the Related Art

In general, an automotive vehicle includes various gauges or meters mounted on an instrument panel constituting the front surface of an instrument cluster. Pointer-type gauges are widely used for speedometers, RPM tachometers, temperature gauges, fuel gauges, etc.

In general, a pointer needle is rotatably mounted at a pointer shaft installed at the center of a character plate so as to rotate about the point shaft above the character plate having a scale and characters thereon. The pointer needle rotates by means of a step motor mounted below the character plate, and controlled by a micro computer.

For night driving, the pointer needle may receive light from an LED to emit light according to the manipulation of a combination switch. The character plate also typically receives light from the LED to cause the scale and the characters to emit light.

However, when the pointer needle continuously indicates a specific character, a front end portion of the pointer needle shields the character, which makes it difficult for a driver to read the character.

Due to this problem, there have been many restrictions in the thickness of the pointer needle or the character position of the gauge apparatus and so forth when designing a pointer.

SUMMARY OF THE INVENTION

The present invention provides a character shielding-preventive pointer instrument for automotive gauges, in which a polarizer film having permeability or non-permeability characteristics selectively depending on whether electric power is supplied or not thereto is attached on a surface of a pointer needle positioned just above characters of a character plate. Whether or not power is supplied to the polarizer film is controlled depending on the current position of the pointer needle by a micro computer such that the polarizer film has a permeability property when the pointer needle passes above a character of the character plate.

Exemplary embodiments of the present invention provide a character shielding-preventive pointer instrument for automotive gauges, including: a pointer needle made of a transparent material and rotatably mounted on a character plate, the pointer needle having a reflective film attached on a lower surface thereof except on a specific section of a front end portion thereof; a step motor mounted below the character plate to rotate the pointer needle; a micro computer to control the step motor; at least one needle-illuminating means mounted below a rear end portion of the pointer needle to illuminate the pointer needle to transfer light emitted therefrom to the pointer needle along the longitudinal direction of the pointer needle while the light is reflected so as to cause the pointer needle to emit the light; a character plate-illuminating means mounted below the character plate to illuminate the character plate to allow scales and characters of the character plate to emit the light; and a polarizer film on a lower surface of the section of the front end portion of the pointer needle without reflective film, the polarizer film having permeability or non-permeability characteristics with respect to light depending on whether or not current is supplied thereto. The polarizer film is attached on a surface of a section of the needle corresponding to the characters of the character plate. The micro computer controls whether current is supplied to the polarizer film, depending on the position of the pointer needle.

The polarizer film may be connected to the micro computer through an electrode mounted along the pointer needle and a rotary shaft engaged with a drive shaft of the step motor, the rotary shaft extending downwardly from the rear end portion of the pointer needle, so that the polarizer film is selectively supplied with current from the micro computer through the electrode.

The micro computer may monitor the driving angle of the step motor so as to recognize the current position of the pointer needle. When the pointer needle is positioned just above a character, the micro computer controls supply of the current to cause the polarizer film to exhibit permeability characteristics, and when the pointer needle is positioned between two adjacent characters, the micro computer controls supply of the current to cause the polarizer film to exhibit non-permeable characteristics.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Reference will now be made in detail to the preferred embodiment of the present invention with reference to the attached drawings.

Figure 1:
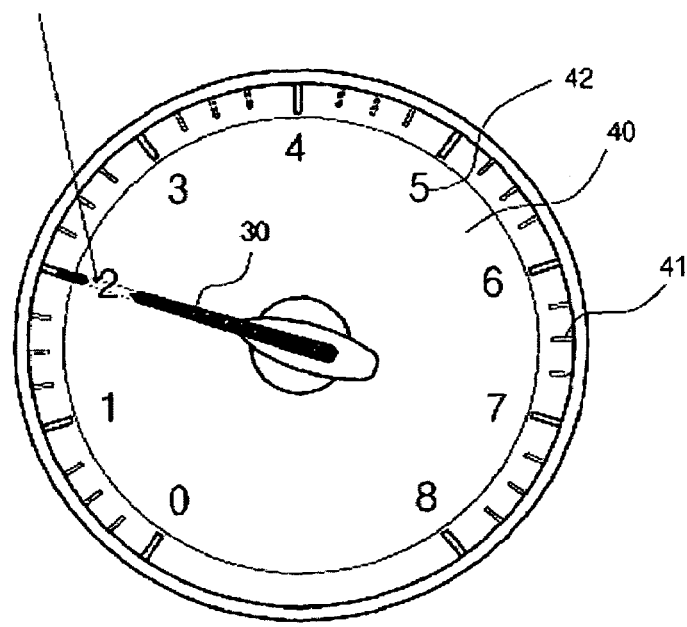
FIGS. 1 and 2 are front view illustrating the operational state of a pointer needle varying depending on the position of the pointer needle in a character shielding-preventive pointer instrument for automotive gauges according to the present invention.
Figure 2:
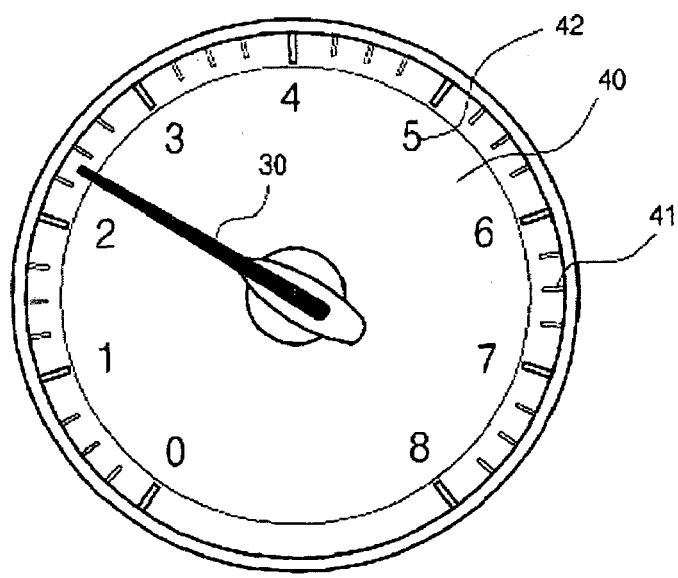

As shown in FIGS. 1 and 2, the character shielding-preventive pointer instrument for automotive gauges according to embodiments of the present invention has a polarizer film attached on an intermediate lower surface of a front end portion of the pointer needle 30 so as to transmit or intercept light depending on whether or not electric power is supplied to the polarizer film, so that the polarizer film has permeability characteristics when the pointer needle is above a character 42 of a character plate 40.

The polarizer film is selectively supplied with current through an electrode.

When the pointer needle 30 is positioned just above a character 42, the supply of current to the polarizer film is interrupted so the polarizer film allows light to pass therethrough. However, when the pointer needle 30 is positioned between two characters 42, the current is supplied to the polarizer film so the polarizer film intercepts the light.

In some embodiments, the supply of current to the polarizer film or the interruption of the supply of the current to the polarizer film is controlled by a micro computer that controls the drive of the step motor. The micro computer monitors the driving angle of the step motor to recognize the position of the pointer needle. When the pointer needle is positioned just above a character, the micro computer interrupts the current, and when the pointer needle is positioned between two characters, i.e., above a section where no character is displayed, the micro computer supplies current to the polarizer film.

Figure 3:
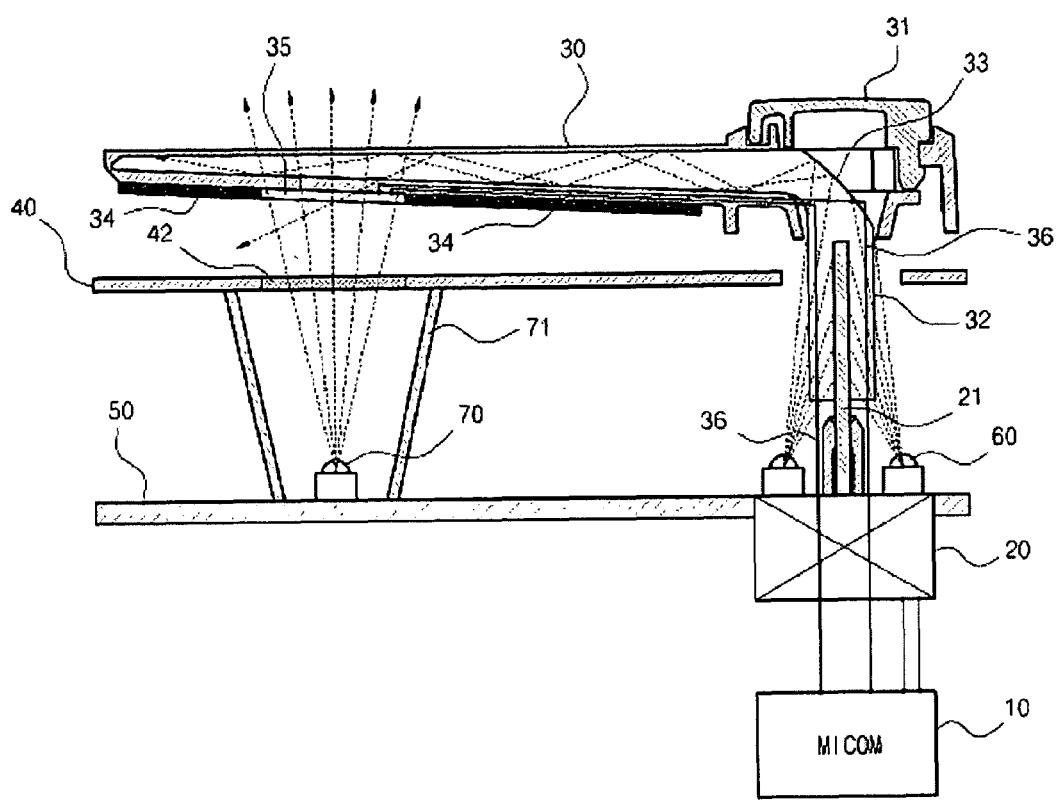
FIGS. 3 and 4 are cross-sectional views illustrating the construction of the character shielding-preventive pointer instrument for automotive gauges according to the present invention.
Figure 4:
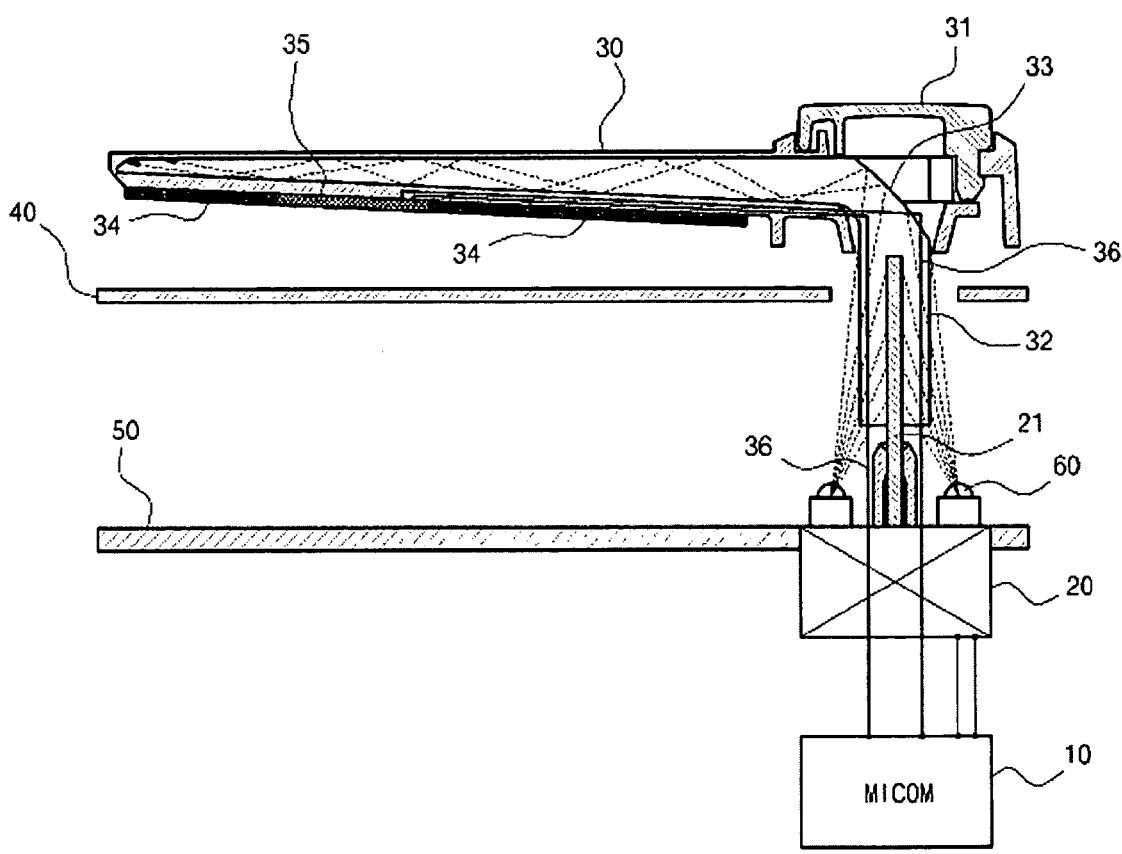

Referring to FIGS. 3 and 4, the pointer needle 30 rotates about a rotary shaft 32 by means of a step motor 20 mounted below the character plate 40, and the driving of the step motor 20 is controlled by the micro computer 10 so as to allow the pointer needle 30 to accurately indicate the current condition of the vehicle on the character plate 40.

A pointer cap 31 is coupled to a rear end portion of the pointer needle 30. A rotary shaft 32 extends downwardly in the FIGs. from the rear end portion of the pointer needle 30 and is fit around a drive shaft 21 of the step motor so that the pointer needle 30 rotates about the rotary shaft 32 in response to the rotation of the step motor 20.

The micro computer 10 controls the driving angle of the step motor 20. The micro computer 10 monitors the driving angle of the step motor 20 to identify the position of the pointer needle 30 so as to judge whether the pointer needle is positioned just above a character 42 of the character plate 40 or the pointer needle 30 is positioned between two characters 42.

Further, the pointer needle 30 is made of a transparent material, i.e., a material which is permeable to light, but may be made of an acrylic material. A polarizer film 35 is attached on an intermediate lower surface of a front end portion of the pointer needle 30, and a reflective film 34 is attached on the entire remaining section of the lower surface of the pointer needle 30. The reflective film 34 may be attached, for example, by a hot stamping process.

The polarizer film 35 is configured to be supplied with an operating current from the micro computer 10 by means of an electrode 36 electrically connected to the polarizer film 35 via the rotary shaft 32 and the pointer needle 30.

A plurality of needle-illuminating light-emitting diodes (LEDs) 60 is mounted below the rear end portion of the pointer needle 30 around the top of the step motor 20. Light irradiated from the LEDs 60 is transferred to a reflective element 33 of the rear end portion of the pointer needle 30 through the rotary shaft 32. The light reflected from the reflective element 33 is transferred to the pointer needle 30 along the longitudinal direction of the pointer needle 30 while being reflected from the reflective film attached on the lower surface of the pointer needle 30 so that it reaches a front distal end of the pointer needle 30.

A character plate-illuminating LED 70 is mounted on a lower plate 50 disposed below the character plate 40 so as to illuminate the character plate 40. A reflector 71 is mounted around the character plate-illuminating LED 70 so as to cause the light emitted from the character plate-illuminating LED 70 to be concentrated upwardly.

A power LED having brightness three to four times as high as a typical high-brightness LED of approximately 600 cd may be used as the needle-illuminating LEDs 60 and the character plate-illuminating LED 70.

Figure 5:
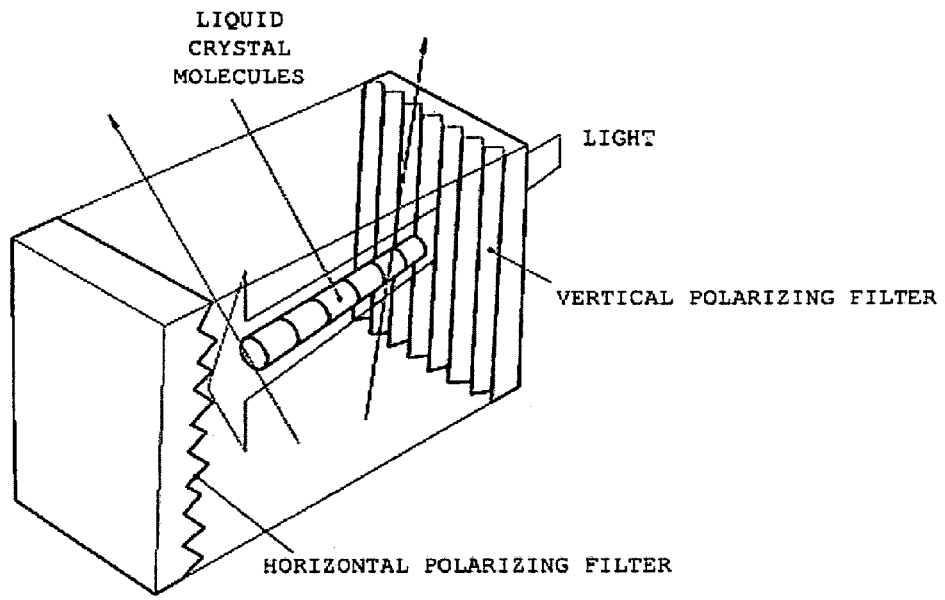
FIGS. 5 and 6 are reference views illustrating the operating principle of a polarizer film used in the character shielding-preventive pointer instrument for automotive gauges according to the present invention.
Figure 6:
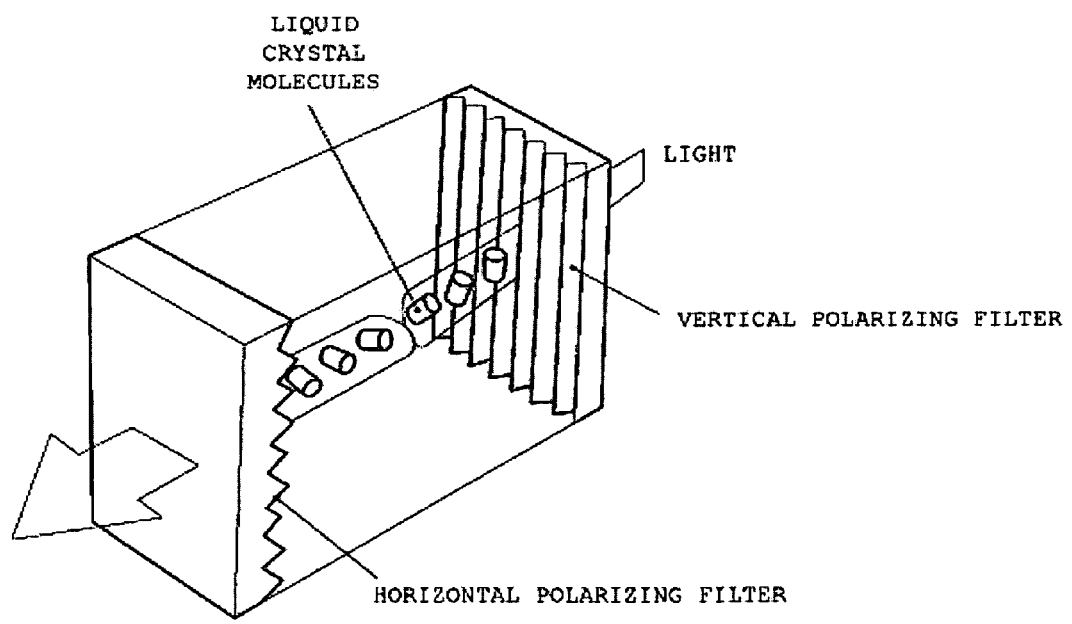

Referring to FIGS. 5 and 6, when the polarizer film is supplied with current from the micro computer through the electrode, the longitudinal axes of liquid crystal molecules inside the polarizer film are aligned perpendicular to vertical and horizontal polarizing filters so as to intercept the light, but not to pass the light therethrough.

Referring also to FIG. 4, illumination of the character side of the character plate 40, i.e., light irradiated toward the pointer needle 30 from the character plate-illuminating LED 70 does not pass through the polarizer film 35 and the polarizer film becomes non-permeable to light. Thus, the polarizer film 35 has the same reflective effect as that of the reflective film 34 attached on the lower surface of the pointer needle 30.

Resultantly, the light irradiated from the needle-illuminating LEDs 60 mounted below the rear end portion of the pointer needle 30 is transferred to the pointer needle 30 along the longitudinal direction of the pointer needle 30 while the pointer needle appears to have its complete shape, i.e. the pointer needle 30 emits light along its entire length.

However, as shown in FIG. 6, the polarizer film 35 passes the light therethrough when the liquid crystal molecules inside the polarizer film 35 are twisted upon the interruption of the supply of current to the polarizer film 35.

In this case, as shown in FIG. 3, the light irradiated toward the pointer needle 30 from the character plate-illuminating LED 70 passes through the polarizer film 35 and the polarizer film becomes permeable to light. Thus, the light permeates the portion of the pointer needle 30 on which the polarizer film 35 is attached. That is, the polarized film-attached portion of the pointer needle is transparent.

In this state, the pointer needle 30 appears to be in a shape in which it is interrupted at the polarized film-attached portion. The corresponding character 42 below the pointer needle 30 is not shielded by the pointer needle 30 but is visible.

The micro computer 10 monitors the driving angle of the step motor 20 to identify the position of the pointer needle 30 so as to selectively supply power to the polarizer film 35 or interrupt the supply of the power depending on the position of the pointer needle at any given time. That is, when the pointer needle 30 passes above the character 42 of the character plate 40, the supply of power to the polarizer film is interrupted by the micro computer 10. On the other hand, when the pointer needle 30 passes between two characters 42, the power is supplied to the polarizer film 35 by the micro computer 10.

As apparent from the foregoing, when the pointer is designed, there are no restrictions in the thickness of the pointer needle or the character position of the gauge apparatus and so forth Furthermore, a visual sense of mystery is induced due to the optical illusion of the pointer needle appearing to be disconnected, thereby contributing to of marketability. While the present invention has been described with reference to the particular illustrative embodiments, it is not to be restricted by the disclosed embodiments but only by the appended claims. It is to be appreciated that those skilled in the art can change or modify the embodiments without departing from the scope and spirit of the present invention.

What is claimed is:

1. A pointer apparatus for gauges, comprising:
   a pointer needle comprising a substantially transparent material and rotatably mounted on a character plate, the pointer needle further comprising a reflective film attached to a first section of a surface thereof;
   a step motor mounted below the character plate and configured to rotate the pointer needle;
   a micro computer to control the driving of the step motor;
   at least one needle-illuminating light mounted below a rear end portion of the pointer needle;
   at least one character plate-illuminating light mounted below the character plate; and
   a polarizer film attached to a second section of the surface of the pointer needle and comprising selective permeability and non-permeability characteristics with respect to light depending on whether or not current is supplied thereto, wherein the micro computer is configured to selectively control whether current is applied to the polarizer film, depending on a rotational position of the pointer needle.

2. The apparatus as set forth in claim 1, wherein the polarizer film is connected to the micro computer through an electrode mounted along the pointer needle and a rotary shaft engaged with a drive shaft of the step motor, the rotary shaft extending from the rear end portion of the pointer needle, so that the polarizer film is selectively supplied with the current from the micro computer through the electrode.

3. The apparatus as set forth in claim 1, wherein the micro computer monitors the driving angle of the step motor to recognize the rotational position of the pointer needle.

* * * * *